C. D. KELLER.

WINDSHIELD.

APPLICATION FILED MAY 22, 1919.

Reissued July 20, 1920. 14,919.

Inventor
Clarence D. Keller
by James T. Barker
his Attorney

UNITED STATES PATENT OFFICE.

CLARENCE D. KELLER, OF LOS ANGELES, CALIFORNIA.

WINDSHIELD.

14,919. Specification of Reissued Letters Patent. Reissued July 20, 1920.

Original No. 1,284,357, dated November 12, 1918, Serial No. 174,770, filed June 14, 1917. Application for reissue filed May 22, 1919. Serial No. 299,030.

*To all whom it may concern:*

Be it known that I, CLARENCE D. KELLER, a citizen of the United States, residing at Los Angeles, in the county of Los Angeles, State of California, have invented new and useful Improvements in Windshields, of which the following is a specification.

This invention relates to a windshield and particularly pertains to an adjustable windshield for automobiles.

It is common practice to fit automobiles with a transversely extending transparent shield which is secured within a suitable frame and mounted upon the dash of the vehicle body. Due to the narrow width of these shields, the wind draws in around the edges and creates considerable draft within the vehicle. It is the principal object of this invention to provide auxiliary transparent shield members which may be secured in an adjustable manner at the opposite sides of the main windshield and more thoroughly prevent the creation of a draft through the vehicle body.

Another object of this invention is to provide a windshield of the above class which does not require the use of a large mounting frame and may thereby be held in position without obstructing the view.

Another object of this invention is to provide a peculiar pivotal mounting for the shield which will allow it to be universally moved throughout a horizontal plane and in relation to the edge of the main shield.

Another object of this invention is to provide simple operating means for instantly locking the pivotal mounting in any desired position.

It is a further object of this invention to provide a windshield which will be neat in its design, simple in its construction and will act to enhance the appearance of the vehicle upon which it is mounted rather than to depreciate it.

Other objects will appear hereinafter.

Figure 2:
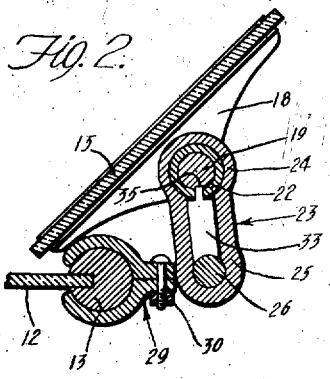
Figure 5:
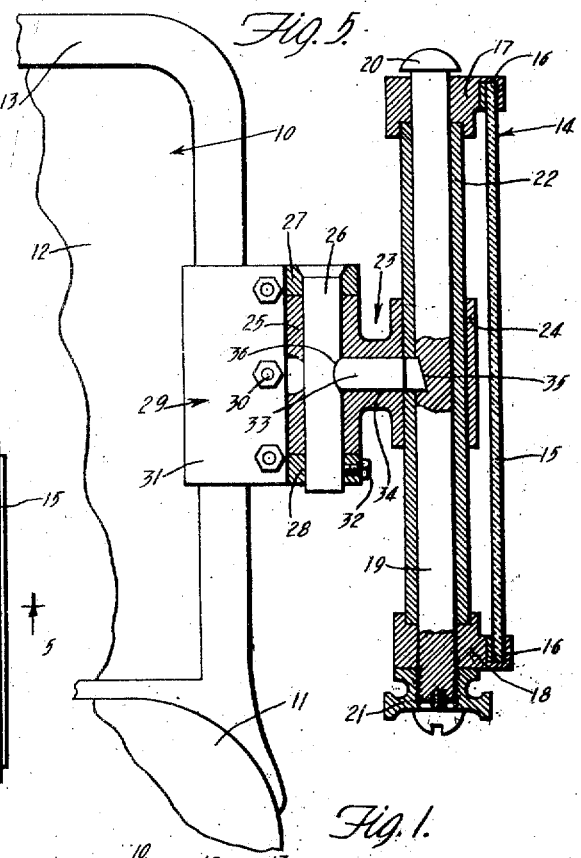
Figure 3:
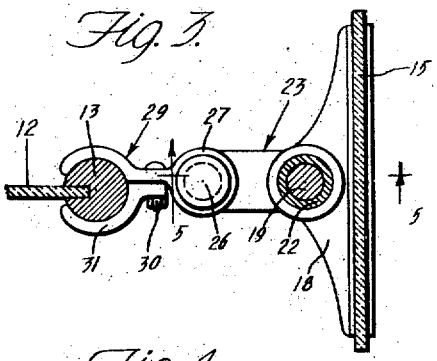
Figure 4:
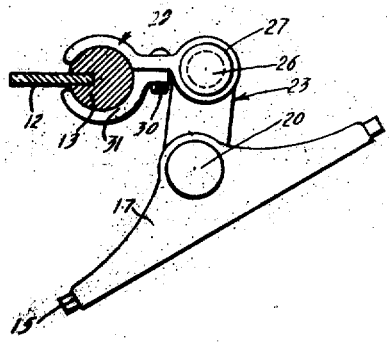
Figure 1:
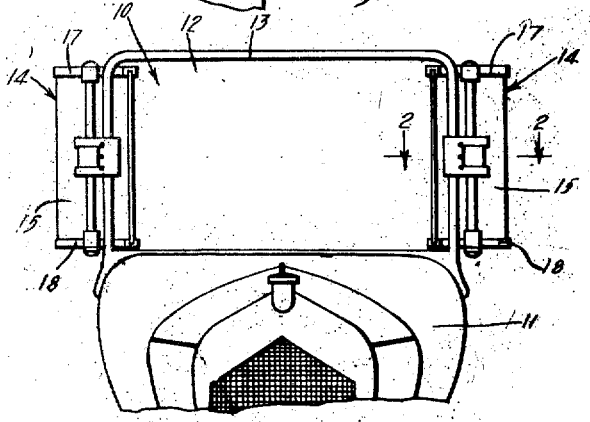

The invention is illustrated, by way of example, in the accompanying drawings in which:

Figure 1 is a view in front elevation illustrating the auxiliary shields as mounted at the opposite sides of the main shield; Fig. 2 is a view in horizontal transverse section, as seen on the line 2—2 of Fig. 1, and particularly illustrates the double hinged joint and the position of the auxiliary shield in relation to the main shield when it is desired to entirely prevent the creation of a draft through the vehicle; Fig. 3 is a view similar to Fig. 2 illustrating the windshield as swung outwardly to an obstructing position alongside the main shield; Fig. 4 is a view similar to the two preceding figures, illustrating the auxiliary windshield as swung forwardly of the main shield so that a circulation of air will be effected through the vehicle; Fig. 5 is an enlarged view in transverse section, as seen on the line 5—5 of Fig. 3, illustrating the detail construction of the windshield mounting and its manner of locking.

Referring more particularly to the drawings, 10 indicates a vertical disposed windshield which is mounted transversely of an automobile body 11, as particularly shown in Fig. 1. This shield is formed of a plate glass portion 12 which is bound by a frame 13. The frame 13 is formed with vertical side posts, upon which are secured the auxiliary windshields 14. It will be understood that the detail construction of the windshield 10 is not material and that the present invention relates particularly to auxiliary shield members which are demountably secured to the vertical posts of the windshield frame 13.

The auxiliary shields 14 consist of rectangular plate-glass portions 15 supported at their upper and lower ends within channels 16 of upper and lower supporting brackets 17 and 18. These brackets are particularly shown in Figs. 2, 3 and 4, where it will be seen that the channels 16 extend the entire width of the glass and unite with the main portion of the brackets, which portions are rotatably mounted upon a vertically disposed shaft 19. This shaft is formed with a head 20 which retains it within the brackets and is formed at its other end with threads upon which a locking nut 21 is adapted to be positioned. The brackets 17 and 18 are spaced from each other by means of a sleeve 22 which fits within counter-bores formed in the adjacent faces of the brackets. This sleeve is secured within a knuckle joint bracket 23, as particularly shown in Fig. 5.

The joint bracket 23 is formed with two parallel bearings 24 and 25, one of which accommodates the sleeve 22 and the other is adapted for the reception of a hinge pin 26. This pin extends through ears 27 and 28 forming a part of a mounting bracket 29. The mounting bracket is adapted to be clamped upon the vertical frame members of the windshield 10 by means of bolts 30 and a clamping plate 31. The pin 26 is secured in its intended position by means of suitable pins or set screws 32. It will thus be seen that the auxiliary shield is provided with universal horizontal movement in relation to the main shield as it swings upon the shaft 19 and the pin 26. The bracket 29 is, to a certain extent as will be seen from Fig. 4; adjustable around the side post 13; and this adjustment adds also to the possibilities of adjustment of the side wing with relation to the main windshield. But, for most purposes of adjustment, the bracket 29 forms merely a mounting bracket to provide a supporting means about which the member 23 may be swung through a very large angle to effect various adjustments of the side wing. The bracket 29 is also adjustable vertically on the side post to adjust the vertical position of the side wing.

One of the important features of this invention is the fact that the auxiliary shield may be locked in any desired angular relation to the windshield by the manipulation of a single locking member. This is accomplished by a lock bolt 33 which extends through a horizontal bore 34 communicating with the vertical bores of the bearings 24 and 25. One end of this bolt is tapered and conforms to a tapered face 35 formed on the side of the shaft 19. The other end of the bolt is rounded to become seated within an arcuate recess 36 formed in the side of the hinge pin 26. It will thus be seen that when the lock nut 21 is tightened upon the shaft 19 it will bear upon the lock shaft of the bracket 18 and act to draw the shaft 19 downwardly. This will wedge the face 35 against the tapered end of the lock bolt 33 and will at the same time wedge the rounded end of the lock bolt against the recess in the hinge pin 26, causing the shaft and pin to be immovable in relation to each other.

In operation, the lock nut 21 may be rotated to relieve the shaft 19. This will permit the windshield to swing upon the shaft 19 and will also allow the shield and bracket 23 to swing around the pin 26. It will be evident that, due to this double pivotal mounting, the windshield may assume any desired angular position in front, at the side, or in the rear of the main shield. After the auxiliary shield has been thus adjusted, tightening of the nut 21, as previously described, will lock it in place.

It will thus be seen that the device here disclosed is formed of few parts which may be readily manufactured, are easily assembled, and may be conveniently operated, as described.

While I have shown the preferred construction of my windshield as now known to me, it will be understood that various changes in the construction, combination, and arrangement of parts may be made by those skilled in the art without departing from the spirit of my invention.

I claim:

1. In an auxiliary windshield, the combination with a vertical supporting post, of a transparent shield member, brackets engaging said member at its upper and lower ends, means whereby said brackets may swing horizontally to adjust the shield, a secondary hinge adapted to act in combination with said first-named hinge to allow the shield to have universal horizontal movement in relation to the supporting post, and means whereby the two joints of the shield may be simultaneously locked.

2. In an auxiliary windshield, the combination with a vertical supporting post, of a transparent shield member, brackets engaging said member at its upper and lower ends, means whereby said brackets may swing horizontally to adjust the shield, a secondary hinge adapted to act in combination with said first-named hinge to allow the shield to have universal horizontal movement in relation to the supporting post, means whereby the two joints of the shield may be simultaneously locked, and means for detachably securing the shield upon said post.

3. In an auxiliary windshield, a rectangular windshield glass, upper and lower supporting brackets having channels in which the glass is mounted and having alined bearings at one side of the glass, a spacing sleeve having its ends rotatably mounted in the bearings, a shaft extending through the bearings and through the sleeve, a lock-nut upon the shaft for tightening the bearings upon the sleeve, a knuckle joint bracket having two parallel bearings; said sleeve being mounted in one bearing; there being a horizontal bore through the bracket and connecting the bearings and there being a passage through the sleeve in line with the bore and there being a tapered face upon the shaft in line with the bore, a lock-bolt mounted in the bore and having a tapered end engaging said tapered face, a mounting bracket having ears between which the other sleeve bearing is mounted, and a hinge pin inserted through the ears and bearing and having a recess to receive the other end of the lock bolt; said mounting bracket being adapted for engagement with the side post of a windshield, so that by loosening the lock-nut upon the shaft the parts may be loosened to move the windshield to a desired position and then by tightening the lock-nut the parts may be held rigid with the main windshield.

4. In an auxiliary windshield, the combination of a shield member, a supporting element for the shield member, and adjustable supporting means for the supporting element embodying a double hinge-joint clamping means engaging and clamping the supporting element and adapted to clamp a stationary member, and a single member for adjusting said clamping means upon the supporting element and a stationary member.

5. In an auxiliary wind shield, the combination of a transparent shield member, supporting means for the shield member comprising a rod extending across the face of the shield member and spaced therefrom, means on the rod engaging and supporting the shield member at spaced points of support and adjustable supporting means for the rod engaging the rod at a point within the side and end edges of the shield member.

6. In an auxiliary windshield, the combination of a shield member, a supporting element for the shield member embodying a rod and spaced brackets thereon engaging and supporting the shield member at spaced points of support, and a single adjustable supporting means for the rod engaging and supporting the rod between the spaced brackets.

7. In an auxiliary windshield, the combination of a shield member, a supporting element for the shield member, a mounting bracket adapted to be mounted on the side post of a windshield, and adjustable thereon, a supporting means mounted on the bracket to swing horizontally thereon and carrying the supporting element to swing horizontally with reference to the supporting means, and a single adjusting means for rigidly connecting the supporting means to the bracket and the supporting element.

8. In an auxiliary wind shield, the combination of a shield member, a supporting element for the shield member, adjustable supporting means for supporting the supporting element embodying a double hinge-joint clamping means, and means embodied in the clamping means and adjustable at a single point to frictionally hold both of its joints against movement.

9. In an auxiliary wind shield, the combination of an unframed transparent shield member, a supporting element for the shield member embodying a rod spaced from and parallel to the shield member, and spaced means thereon connected to and supporting the shield member at spaced points of support, and adjustable supporting means for the rod engaging the rod at a point between the end edges of the shield member.

10. In an auxiliary windshield the combination of a shield member and supporting means therefor embodying a longitudinal member substantially parallel to the plane of the shield member and spaced from the plane thereof, said longitudinal member terminating between the ends of the shield member, means at each end of said longitudinal supporting member movable relatively to said member and engaging the shield member, and a single supporting means for the longitudinal member engaging said member between its connections to the shield member.

11. In an auxiliary windshield, the combination of an unframed transparent shield member, and a supporting element therefor embodying a longitudinal member substantially parallel to the plane of the shield member and spaced from the plane thereof, and means at each end of said longitudinal supporting member engaging the shield member, swinging supporting means carrying said longitudinal member, and the shield member being swingingly adjustable about the center of the longitudinal member as an axis.

12. In an auxiliary windshield, the combination of a shield member, a supporting element therefor embodying a longitudinal member substantially parallel to the plane of the shield member, shield engaging and supporting brackets mounted and rotatable on the ends of the longitudinal member, and a single swinging supporting means for the longitudinal member engaging said member at a single point between its connections to the shield member.

13. In an auxiliary windshield, the combination of a shield member, a supporting element therefor embodying a supporting member and brackets, spacedly mounted thereon and engaging the shield member, said brackets being rotatable on the supporting member, and a single means whereby both brackets may be simultaneously held from rotation on said member or loosened to rotate thereon.

14. In an auxiliary windshield, the combination of a shield member, a supporting element therefor embodying a hollow rod and brackets rotatively mounted in spaced relation on the rod and engaging and supporting the shield member at spaced points, and a means embodying a clamping rod extending through the hollow supporting rod adapted to clamp the brackets to the supporting rod and hold them against movement thereon.

15. In an auxiliary wind shield, the combination of an unframed transparent shield member, a supporting element for the shield member embodying a rod spaced from and parallel to the shield member, and spaced means on the rod engaging and supporting the shield member at spaced points of support, and a single adjustable supporting means for the rod engaging the rod at a point between the end edges of the shield member.

16. In an auxiliary windshield, the combination of a shield member, and supporting means therefor embodying a rod substantially parallel to the member, brackets at the end of the rod engaging and supporting the member and rotatable on the rod, a stationary element, and a supporting and clamping device embodying a member engaging the stationary element and engaging and supporting the rod, and means for simultaneously setting and holding the said member against movement on the stationary element and the brackets against movement on the rod.

17. In an auxiliary wind shield, the combination of an unframed transparent shield member, a supporting element for the shield member embodying a longitudinally extending rod spaced from and parallel to the shield member, and spaced means on the rod engaging and supporting the shield member at spaced points of support, and a single adjustable supporting means engaging the rod at a point between the end edges of the shield member.

18. In an auxiliary wind shield, a transparent shield member, and adjustable carrying means for the member embodying a two hinge-joint adjustable supporting member situated entirely between the side and end edges, respectively of the shield member, both pivotal joints thereof being spaced from the face of the shield member.

19. In an auxiliary wind shield, the combination of a transparent shield member and supporting means therefor embodying a longitudinal member extending across the face of the shield member and a supporting member engaging said longitudinal member at a point intermediate the end edges of the shield, said shield member being adjustable about the center of said longitudinal member as an axis.

20. In an auxiliary wind shield, the combination of a transparent shield member and supporting means therefor embodying a longitudinal rod extending across the face of the shield member, and spaced therefrom, shield engaging and supporting means on said member, and a supporting member engaging the rod intermediate the side and end edges of the shield, said shield being adjustable about the axis of the rod as a center.

21. In an auxiliary wind shield, the combination of a transparent shield member and supporting means therefor embodying a longitudinal rod extending across the face of the shield member, and spaced therefrom, shield engaging and supporting means on said member, a supporting member engaging the rod intermediate the side and end edges of the shield, said shield being adjustable about the axis of the rod as a center, and means to lock said shield member in any selected position about the axis of said rod.

22. In an auxiliary wind shield, the combination of a transparent shield member and supporting means therefor embodying a longitudinal rod extending across the face of the shield member, and spaced therefrom, shield engaging and supporting means on said member, a supporting member engaging the rod intermediate the side and end edges of the shield, said shield being adjustable about the axis of the rod as a center, and means to frictionally clamp said shield member in any selected position about the axis of said rod.

23. In an auxiliary wind shield, the combination of a transparent shield member, and supporting means therefor embodying a longitudinal member secured to the shield, said member extending across the face of the shield and being spaced from the plane thereof, a supporting member engaging the longitudinal member between the ends of the latter, said shield having a pivotal movement about the axis of said longitudinal member as a center, means for pivotally connecting said last mentioned member to the side post of a wind shield and single adjusting means for locking all pivotal joints of said supporting means.

In witness that I claim the foregoing I have hereunto subscribed my name.

CLARENCE D. KELLER.